United States Patent [19]

Swanstrom

[11] Patent Number: 4,676,421
[45] Date of Patent: Jun. 30, 1987

[54] PRESS HAVING A PROGRAMMABLE RAM WITH SENSING MEANS

[75] Inventor: Kenneth A. Swanstrom, Buckingham Township, Bucks County, Pa.

[73] Assignee: Penn Engineering & Manufacturing Corp., Danboro, Pa.

[21] Appl. No.: 845,954

[22] Filed: Mar. 31, 1986

[51] Int. Cl.⁴ .............................................. B21J 15/28
[52] U.S. Cl. ............................................ 227/8; 227/4
[58] Field of Search .................................... 227/1, 2–5, 227/8; 100/53, 50, 48, 99; 192/129 R, 129 A, 130, 134; 72/8, 21, 26

[56] References Cited

U.S. PATENT DOCUMENTS 4,208,895  6/1980  Grigorenko et al. ............... 72/8
4,291,359 10/1981  Dieterle .............................. 100/53
4,391,358  7/1983  Haeger .............................. 192/134
4,488,237 12/1984  Aronson et al. ..................... 72/8
4,489,578 12/1984  Nagai et al. ...................... 192/129 A Primary Examiner—E. R. Kazenske
Assistant Examiner—James L. Wolfe
Attorney, Agent, or Firm—Gregory J. Gore

[57] ABSTRACT

A point of operation safety device for hydraulic or pneumatic presses. The safety device is computer controlled and limits the movement of the punch by employing two sensing devices. These sensing devices include both position and contact sensors which are used as dual input variables to satisfy computer monitored operational condition limits which, if not met, shut down the operation of the machine to prevent accident or injury to the operator. Both sensing devices are located within the housing of the press and the ram assembly so that no additional structures are required which might obstruct the working area and thereby hinder the efficient use of the press. Because the components of this safety device are located within the body of the machinery and include complicated electronic control circuitry, it is impossible to defeat the safety mechanism by disconnecting any of the components.

11 Claims, 6 Drawing Figures

PRESS HAVING A PROGRAMMABLE RAM WITH SENSING MEANS

FIELD OF THE INVENTION

This invention relates to a safety device for industrial machinery. More specifically, the invention relates to machines having a zone of danger to the operator at the point of operation or pinch point such as presses, brakes, shears, etc. All of these machines have a stationary element and an opposing movable element which performs an operation on a workpiece therebetween.

BACKGROUND OF THE INVENTION

There are many previous patents and prior art devices which attempt to provide point of operation safety to protect the operator from the pinch point. However, these attempts have shown to be costly, cumbersome, inefficient and, most importantly, they are not tamperproof and can reduce either the effectiveness or the operating speed of the machine.

For example, the prior U.S. Pat. No. 4,395,641 to Dise shows a point of operation safety device which employs an external sensing probe to predetermine a safe condition around the workpiece to control operation of the machine. This probe, however, adds an additional complexity to the machine and presents an obstruction in the area at the point of operation which hinders the free and efficient use of the machine.

U.S. Pat. No. 4,570,839 to Cox et al discloses a press with simple contact switches to limit the high force portion of the ram stroke to a small range near the work-piece.

Likewise, other machines have employed various sensing devices for establishing a safety condition as a limit for machine operation. However, all of these safety devices have some of the problems mentioned above including the fact that these extra mechanisms may be easily deactivated or dismantled by owners or the operators in order to increase production speed at the sacrifice of operator safety.

SUMMARY OF THE INVENTION

This description further illustrates and describes an embodiment of the instant invention as applied to presses of the type for installing fasteners, such as rivets, eyelets, spacer studs, self-clinching nuts and standoffs or the like into flat or preformed sheet metal assemblies. Safety of operation is achieved by providing accurate control over the punch by employing two sensing means.

Punch position sensing means and punch contact sensing means are used as dual input variables to satisfy computer monitored operational condition limits which, if not met, shut down the operation of the machine to prevent accident or injury to the operator. In this way, the punch itself is used as a sensing safety probe to control press operation.

In the broadest terms, a ram assembly comprising a punch, a tool holder, a safety actuator, a ram rod, and a piston has two modes of operation. A low force mode controls general ram assembly movement throughout its stroke and a high force mode applies the necessary force to the workpiece. Both contact and position sensors are coordinated to restrict the high force operation of the ram assembly to a very limited range of its stroke creating a vertical window of operation. This window of operation is located very close to the workpiece so that it is impossible for the operator to have a portion of his body, such as a hand or finger, between the end of the punch and the workpiece when high force is applied.

Both sensing means are located within the existing housing of the press and the ram assembly so that no additional structures are required which might obstruct the working area and thereby hinder the efficient use of the press. The position sensor means of the ram assembly is located within the machine housing and employs a rotary encoder which is connected to the piston of the main cylinder. The punch contact sensing means comprises a simple spring bias switch which is located in the lower part of the ram assembly at a comfortable distance from the point of operation of the punch. Because the components of this safety device are located within the body of the machinery and include complicated electronic control circuitry, it would be extremely difficult to defeat the safety mechanism by disconnecting components and still operate the machine. This is an important feature of this invention.

The present safety device is computer controlled. Programmed control circuitry will stop the operation of the machine if it detects that the descending ram assembly has contacted an object when the ram is not within the specified window of operation. Furthermore, if the contact sensing means indicates that the punch has not contacted an object within its operational window, this second condition will also interrupt the operation of the machine. In addition, the control circuitry contains instructions which measure the elapsed time between the ram assembly's initial downward descent and when the punch contacts the workpiece. If too much time has elapsed during this interval, the operation of the machine is stopped. These events represent an abnormality in the working cyle which, if operation of the machine was not interrupted, might cause serious harm or injury to the operator or cause damage to the workpiece.

The position sensing means, a rotary encoder, is connected to a ball screw rod which converts the linear motion of the ram into precise rotary motion of the encoder shaft. By electronically counting the turns of encoder shaft from zero or home position, the position of the ram assembly, and hence the punch, can accurately be determined at all times throughout its operating cycle. A proximity switch mounted on the main cylinder resets the home position recorded within the computer controller each time the ram assembly is fully retracted. The punch contact sensing means comprises a light-emitting diode/photo-transistor continuity switch which detects movement of a spring-biased safety actuator which, in turn, signals when the end of the punch has contacted an object. Both sensing means are connected to electronic computer controller circuitry having appropriate programming. All sequencing is initiated by operator controls.

Self-programming of this safety device for different work setups is achieved by the operator performing a preliminary test cycle wherein both sensing means are used as program inputs. The press "learns" the proper limits of operation by being first led through its cycle of operation on a given workpiece under low pressure. In this way, the sensing means perform the dual function of inputs for both the programming mode and operational mode of the present invention. This makes the setup for programming of the safety device a very simple task, even for a very unskilled operator, which lends to the ease of use of the present safety device.

To prevent the possibility of disabling the safety device, the computer controller will not permit the operation of the press if any of the connections between the controller and the contact sensing means or position sensing means have been disconnected.

It is an object of the present invention to create a safety device which cannot be defeated or deactivated by the operator.

It is another object of the present invention to provide a safety device which adds no structural obstacles in the area of operation.

It is a further object of the present invention to create a safety device which is simple, efficient, and self-adjusting or, in the case of the preferred embodiment of the present invention, reprogrammable to accommodate different production setups.

It is a further object of the present invention to provide a programmable safety device which can be used by an unskilled operator.

It is an additional object of the present invention to provide an operator safety device in an assembly press which functions equally well with either conducting or nonconducting work materials.

This invention also has other features and advantages which will be apparent from the following description. It should be understood that the invention is not limited to the embodiment illustrated herein since it may be used in conjunction with various types of machines and may take various forms as may be obvious to those skilled in the arts of mechanical and electrical engineering.

DESCRIPTION OF THE PREFERRED EMBODIMENT

Figure 1:
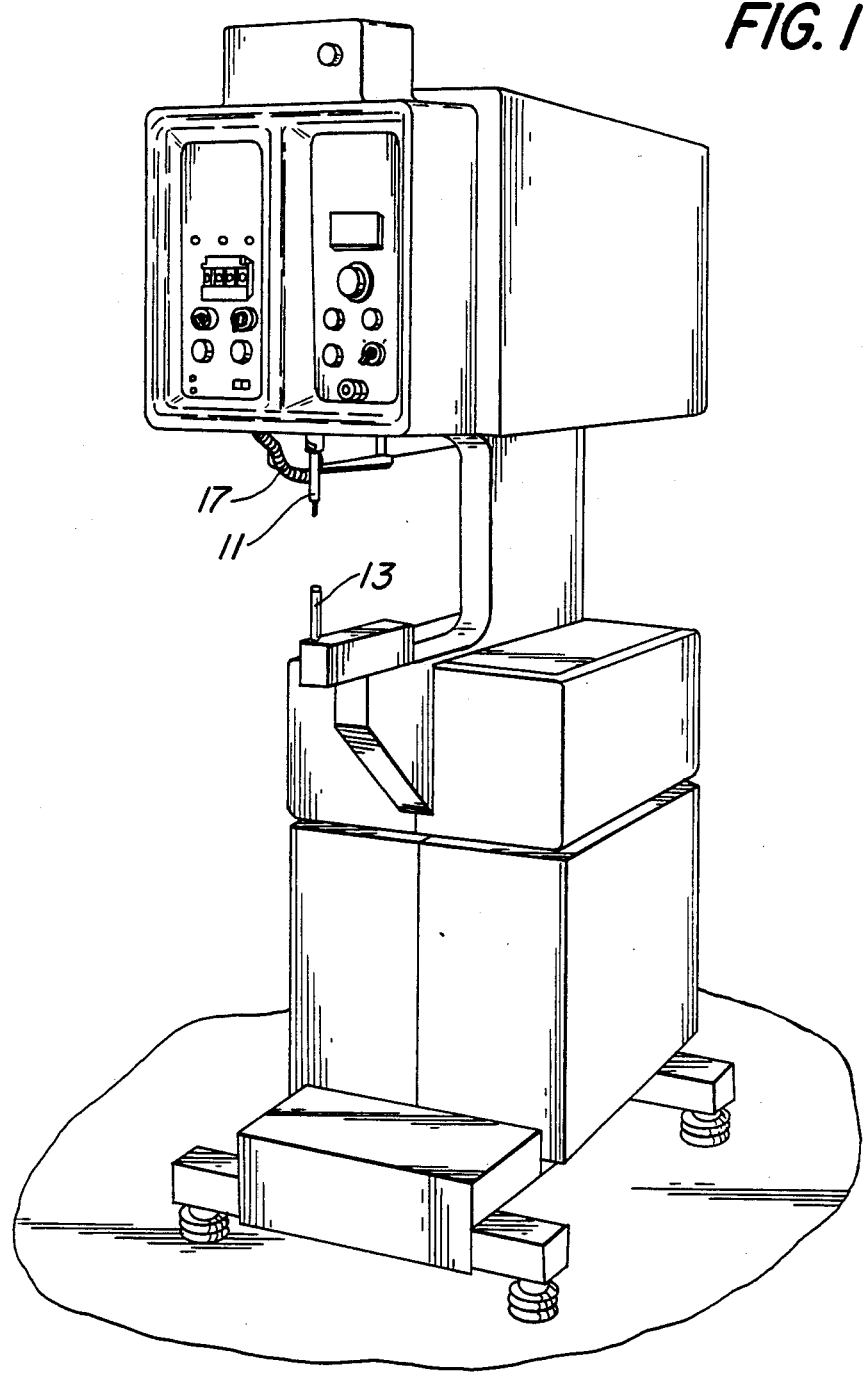
FIG. 1 shows an isometric view of a hydraulic press containing the novel safety device.

Referring to FIG. 1, an assembly press is depicted in which the novel safety device has been installed. This figure shows that the throat area around the anvil 13 and punch 11 are free of any obstruction. Punch contact sensing means is located in a safety actuator housing which is attached electrically to other circuitry by a small coiled wire 17.

Figure 2:
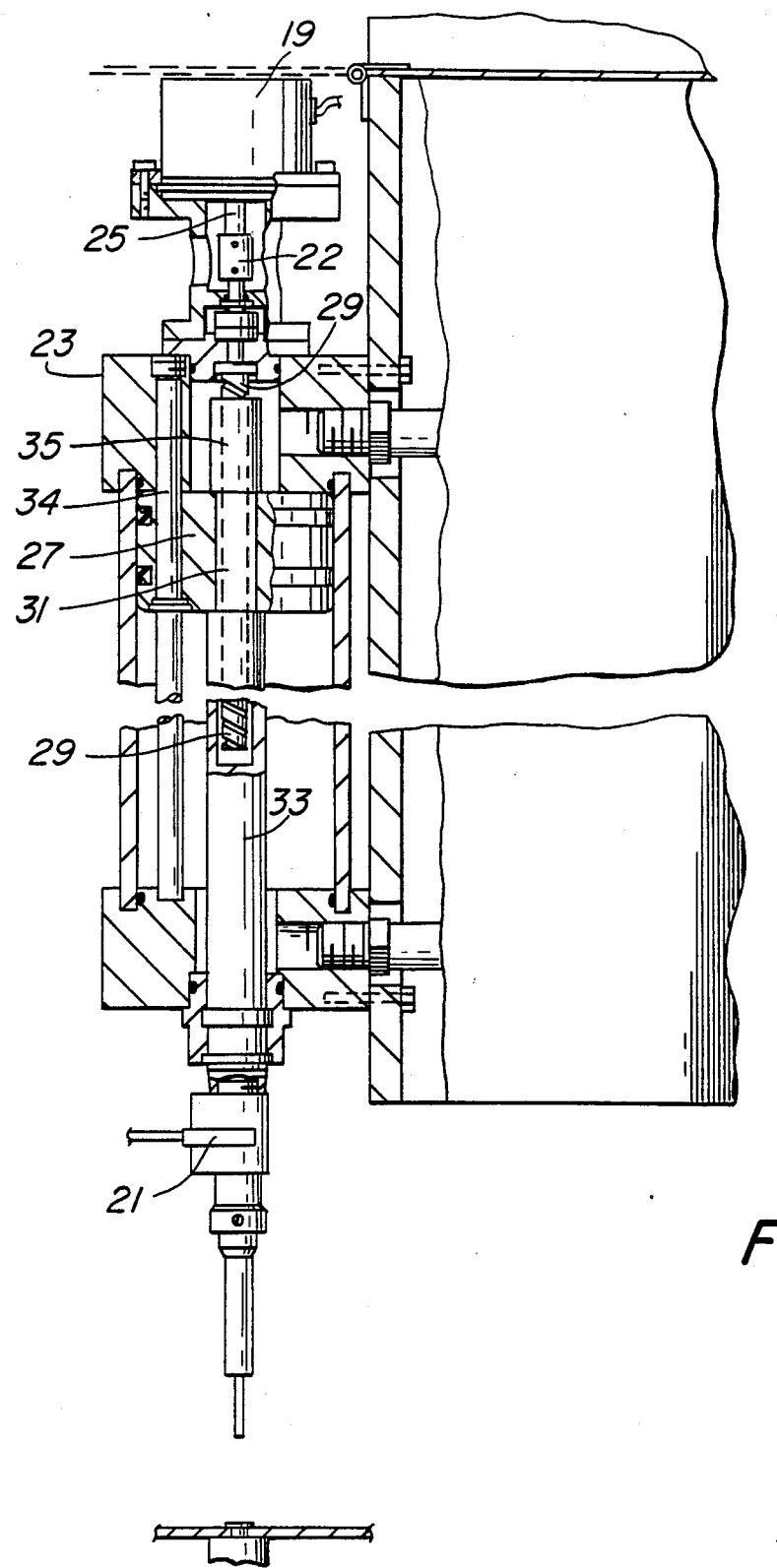
FIG. 2 is a sectional view of the ram assembly, including piston and encoder linkage.

FIG. 2 shows the location of both the punch position sensing means 19 and punch contact sensing means 21 relative to the main cylinder 23. The punch position sensing means 19 in this embodiment is a rotary incremental optical encoder which is mounted directly above the main cylinder 23. This encoder is of the type manufactured by BEI Electronics, Inc. of Goleta, Calif., as Model E25. The optical encoder shaft 25 is connected to the piston 27 by way of coupling 22 and ball screw rod 29 which occupies concentric bore 31 within the piston 27 and ram rod 33 as shown in the drawing. Ball nut means 35 is fixed on top of the piston which acts upon the thread of ball screw rod 29 to turn the encoder shaft by the linear travel of the piston. Guide bar 34 prevents rotation of the piston. Since the punch is connected to the piston 27 through the elements of the ram assembly, the encoder can be used as an accurate sensing means to determine the position of the punch. A proximity switch mounted on the main cylinder resets the home position recorded within the computer controller each time the ram assembly is fully retracted.

Figure 3:
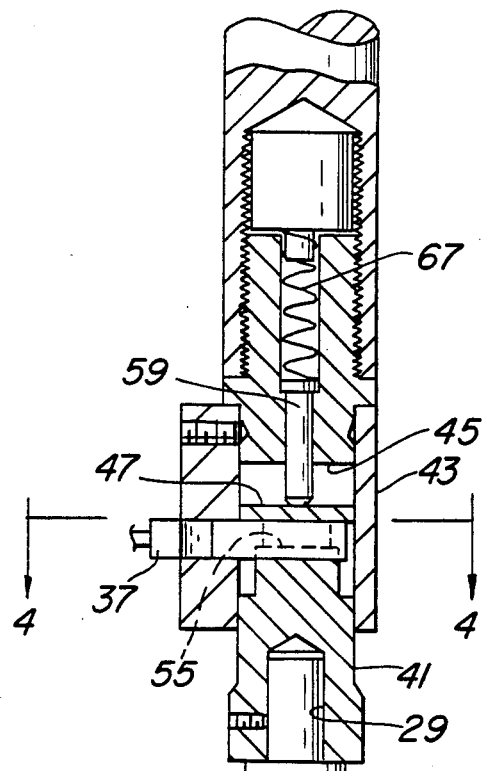
FIG. 3 shows a sectional view of the ram contact sensing means.

FIG. 3 shows the structure of the punch contact sensor and safety switch 37. A safety actuator 41 is permitted a limited range of travel within housing 43. This range of travel is indicated by the distance between the head of the safety actuator 47 and the bottom of the ram rod adaptor 45, in this case a maximum of 0.25 inches. This range is necessary to compensate for the lag time between the optical detector signal and the actual point at which the ram assembly is halted. A standard punch 11 is inserted into a tool holder portion 29 of the safety actuator 41.

Figure 4:
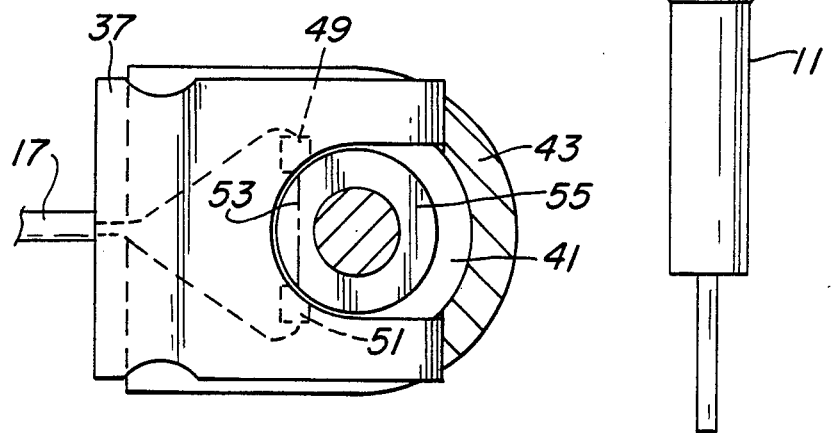
FIG. 4 is a sectional view taken from FIG. 3 showing details of the photo-detector switch means.

FIG. 4 shows further details of the punch contact sensing means which is a simple optical detector switch comprising a light emitter 49 and a light receptor 51 which creates light path 53 which can be broken by upward movement of the safety actuator shoulder 55 greater than 0.03 inches relative to the ram rod. This occurs every time the punch hits an object with a downward force of more than 5 pounds which is required to overcome the spring bias means 67 shown in FIG. 3. This force is transmitted to the safety actuator 41 by pin 59.

Figure 5:
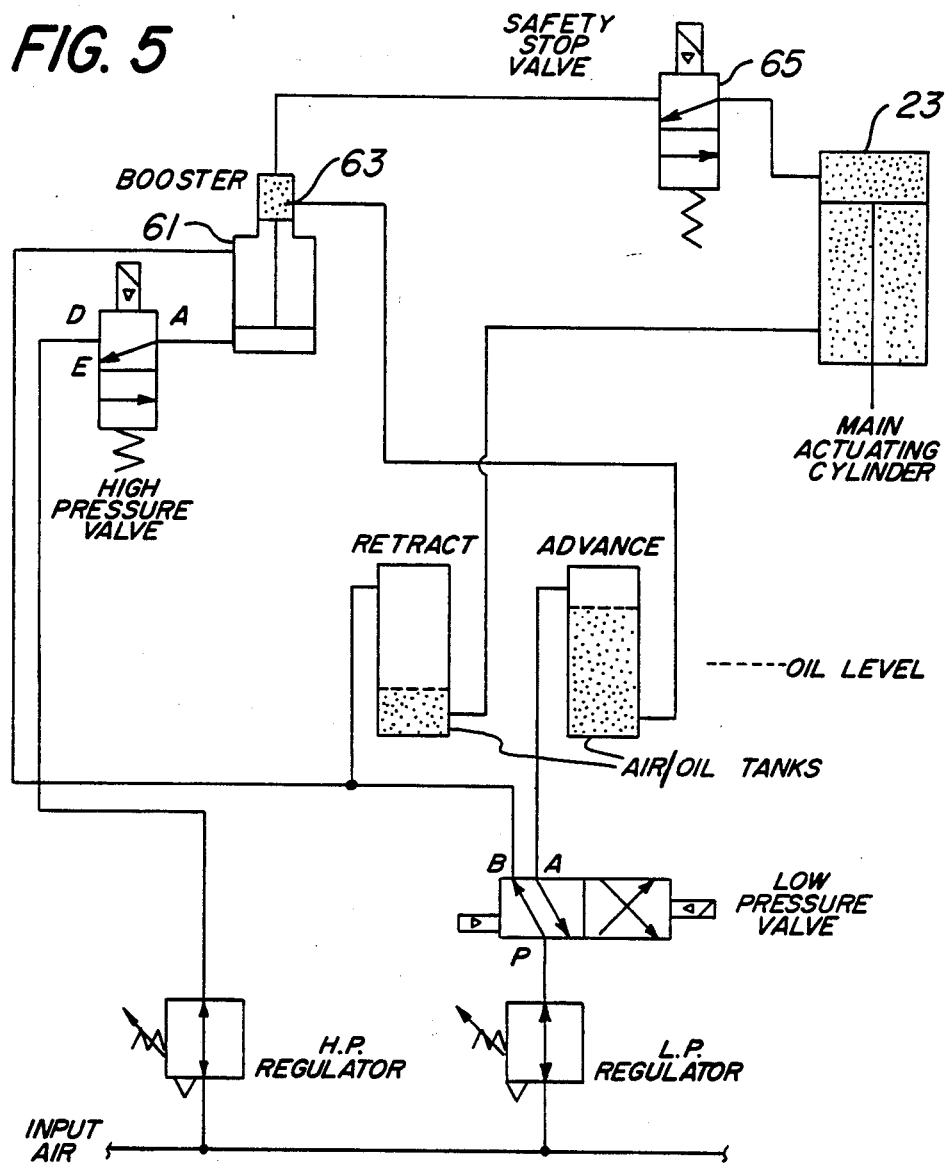
FIG. 5 is a chart which is a schematic of the hydraulic and pneumatic circuiting.

FIG. 5 shows a schematic diagram of the pneumatic and hydraulic circuiting which controls the movement of main actuating cylinder 23. The press of the preferred embodiment employs an "air over oil" system in which air pressure is fed alternately to the top of advance and retract oil resevoirs to control the oil flow to the main cylinder as shown in the diagram. Low pressure valve means directs pressure to either the advance or retract oil resevoirs to advance or retract the ram assembly. In this way, the ram assembly moves under low pressure.

When booster cylinder 61 is activated by valving, variable air pressure is fed to a booster actuating cylinder and the booster piston advances. The hydraulic port 63 of the booster cylinder is in the hydraulic circuit between the advance resevoir and the main actuating cylinder 23. As the booster pistons advance, the port 63 to the advance oil resevoir is closed and oil pressure to the main actuating cylinder is multiplied, thereby increasing the ram assembly force by a ratio depending upon the relative areas of the booster pistons.

Safety valve 65 is positioned in the advance line between the main actuating cylinder and the booster. If the computer controller signals a potentially unsafe condition, the safety valve is de-energized to stop the flow of oil to the main actuating cylinder. This immediately stops movement of the piston and punch. The low pressure valve is then automatically de-energized applying air to the top of the retract oil resevoir. Simultaneously the booster air cylinder is reversed uncovering port 63. The safety valve 65 is energized allowing oil to return to the advance air/oil tank returning the ram assembly to home position.

The safety device of the present invention is designed to be set as follows: after turning on the press, the operator must first test the free movement of the ram contact sensing means by lifting up the end of the punch to verify its proper operation. Next, the machine is set for a programming mode and a workpiece and fastener is placed on the anvil. After depressing a foot switch, the ram descends under low pressure and a high speed counter circuitry counts the input signals from the optical encoder. When the punch touches the workpiece, the ram contact sensing means signals the computer controller to record this ram position as indicated by the optical encoder. Computer controller then calculates and records a 1/10-inch zone of operation above and below this point. The upper and lower points of this operational zone are recorded in the control program memory. Once the operational zone is set, the safety valve is energized for 0.5 seconds and the ram assembly retracts to home position. Under this setup mode, only low pressure acts on the workpiece.

The control program may then be switched to a run position and the machine will now operate normally with the ram descending upon the workpiece under low pressure. High force is applied upon contact signal from the ram contact sensing means if the punch is within the permitted zone of operation. However, the ram will be halted by the de-energizing of the ram safety valve when signalled by the computer controller under the following conditions:

(a) if the punch contact sensing means indicates punch contact at any time during the initial 2.2 inches of punch travel, (b) if the punch contact sensing means indicates punch contact between initial 2.2 inches of punch travel and the point of punch travel which begins the zone of operation, (c) if the punch contact sensing means does not contact the workpiece within the preset zone of operation, or (d) if more than 3 seconds has elapsed between the time the operator initiates the descent of the ram by operation of a foot switch and when the punch contacts the workpiece. A timing circuit within the programming means monitors this condition and will de-energize the safety stop valve if this time limit is exceeded.

Figure 6:
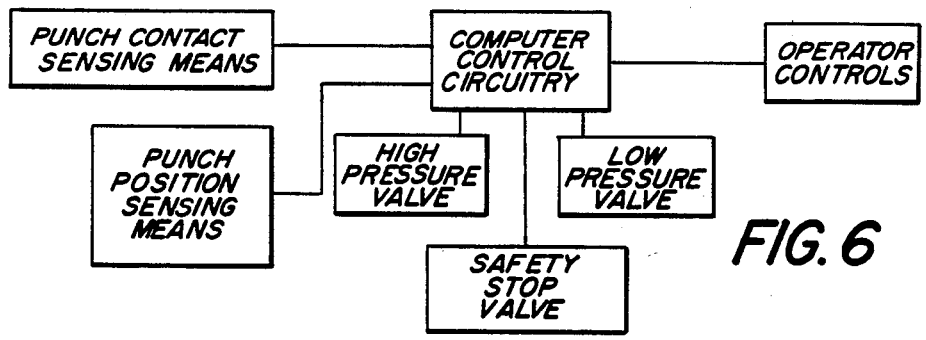
FIG. 6 is a chart showing the processing of information from input means to control the operation of the press.

In this way, elapsed time, punch position, and zone of operation are all functional limits of the normal operating cycle which must be satisfied or the operation of the machine will be halted and the ram retracted to home position. A change in any of these limits is a possible indication of an unsafe condition and increased safety is achieved by stopping the ram. Because the programmed zone of operation is such a small increment of ram assembly travel, it would be physically impossible for the operator's hand or finger, which are often in the area of the workpiece, to become caught and injured between the punch and the workpiece. Thus, as depicted in FIG. 6, the computer controller circuitry coordinates the operator controls with the various inputs from both sensing means of the punch to limit operation of the press.

It will be appreciated from those of ordinary skill in the electronic computer arts that the programming and circuitry to achieve the results herein disclosed may be accomplished by a variety of electronic circuitry and related programming. The specific program employed in one embodiment of the safety device disclosed herein is fully described and set forth at length in materials deposited in the U.S. Library of Congress under the Copyright Registration Act. These materials are identified as Registration No. TXu 206-903 entitled "Series 1000 Program and Cross Reference". The materials deposited under this copyright registration are hereby incorporated by reference and made a part hereof as though fully set forth.

It should be understood that there are many modifications and adaptations to the embodiment of the invention outlined herein and still fall within the scope and spirit of the invention. It is not, therefore, intended that the specific embodiments described herein be a limitation upon the scope of the invention which shall be determined by the appended claims and their legal equivalents.

What is claimed:

1. A press for assembling fasteners into a workpiece having a frame with a base, comprising:
   (a) an anvil secured to said base,
   (b) a ram assembly including a punch attached to the frame above the anvil,
   (c) a main actuating cylinder connected to said ram assembly and punch for moving said punch along a path between a retracted position and a position of contact with said fastener or said workpiece located on said anvil,
   (d) sensing means for sensing when said punch contacts the workpiece, said contact sensing means connected to said ram assembly,
   (e) sensing means for continuously sensing the position of said punch relative to said anvil, said position sensing means connected to said ram assembly, and
   (f) a controller for limiting the operation of said press, said controller connected to and continuously signalled by both the contact sensing means and said punch position sensing means whereby the operation of the press may be halted.

2. The press of claim 1 further described in that said punch contact sensing means comprises a detector switch located within said ram assembly.

3. The press of claim 2 further described in that said punch position sensing means is an encoding device whereby the position of said ram assembly relative to said anvil and hence said punch may be continuously determined by said controller.

4. The press of claim 3 further including a safety valve located in a hydraulic circuit leading to said actuating cylinder for the purpose of shutting off the flow of oil to said cylinder to stop motion of the ram assembly, said safety valve connected to said controller to signal the activation of said safety valve upon sensing a potentially unsafe condition.

5. The press of claim 4 further described in that said controller contains a provision for self-programming whereby the ram assembly may be led through a proposed work cycle upon given work materials in order to preset the operational limits within said controller.

6. The press of claim 5 wherein said punch contact sensing means is activated by relative movement between said punch and said ram assembly.

7. The press of claim 6 further described in that said punch position sensing means is an optical rotary encoder connected to said ram assembly whereby the movement of said ram assembly turns the shaft of said rotary encoder.

8. The press of claim 7 further described in that said controller contains a timing circuit for measuring the elapsed time of ram assembly movement between a retracted position and a workpiece contact position whereby the ram assembly is halted if said elapsed time exceeds a preset maximum.

9. The press of claim 8 further described in that said controller is self-programmable and restricts the full force movement of said punch to a portion of its stroke creating a window of operation near the point of contact with said workpiece, said workpiece contact point being established within said controller by moving the ram assembly from its fully retracted home position into contacting relationship with said workpiece during a setup operating mode to program said controller.

10. The press of claim 9 further described in that said controller will halt the motion of said ram assembly if said punch contact sensing means indicates that said punch has contacted an object which is not within said window of operation.

11. The press of claim 10 further described in that said controller will halt the motion of said ram assembly if said punch contact sensing means indicates that said punch has not contacted an object which is within said window of operation.

* * * * *